(12) United States Patent
Min et al.

(10) Patent No.: US 7,612,505 B2
(45) Date of Patent: Nov. 3, 2009

(54) LIQUID CRYSTAL DISPLAY BACKLIGHT INVERTER

(75) Inventors: Byoung Own Min, Gyunggi-do (KR); Jung Chul Gong, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 196 days.

(21) Appl. No.: 11/812,678

(22) Filed: Jun. 20, 2007

(65) Prior Publication Data
US 2007/0290723 A1 Dec. 20, 2007

(30) Foreign Application Priority Data
Jun. 20, 2006 (KR) .................. 10-2006-0055397

(51) Int. Cl.
*H05B 37/02* (2006.01)
(52) U.S. Cl. ............. 315/291; 315/247; 315/360; 345/87; 345/102
(58) Field of Classification Search ......... 315/224–226, 315/246–247, 291, 299, 307–308, 360, DIG. 4; 345/87, 102, 204
See application file for complete search history.

(56) References Cited

U.S. PATENT DOCUMENTS

| | | | | |
|---|---|---|---|---|
| 4,682,083 | A * | 7/1987 | Alley ................. | 315/307 |
| 7,394,209 | B2 * | 7/2008 | Lin et al. ............ | 315/247 |
| 2002/0063534 | A1 | 3/2002 | Min | |
| 2004/0032223 | A1 * | 2/2004 | Henry ................. | 315/291 |
| 2005/0078080 | A1 * | 4/2005 | Kang et al. .......... | 345/102 |
| 2005/0190142 | A1 * | 9/2005 | Ferguson ............. | 345/102 |
| 2007/0188111 | A1 * | 8/2007 | Taipale ............... | 315/291 |
| 2008/0136343 | A1 * | 6/2008 | Yu et al. ............. | 315/219 |

FOREIGN PATENT DOCUMENTS

CN 2072754 U 3/1991

OTHER PUBLICATIONS

Chinese Office Action, with English Translation, issued in Chinese Patent Application No. CN 200710111450.8 dated on Jul. 18, 2008.

* cited by examiner

*Primary Examiner*—David Hung Vu
*Assistant Examiner*—Tung X Le
(74) *Attorney, Agent, or Firm*—McDermott Will & Emery LLP

(57) ABSTRACT

A LCD backlight inverter including: a dimming control unit comparing a level of a triangle wave with a level of a dimming control signal and controlling a dimming control current to be supplied or interrupted according to a comparison result; an error amplification unit having an input end to which a detection voltage corresponding to the dimming control current and a current flowing through a lamp are inputted, comparing the detection voltage with a predetermined reference voltage, and outputting an error voltage corresponding to a difference via an output end thereof, the output end working as a ground when the dimming control current is not inputted; and a time constant circuit unit comprising a resistor connected between the output end of the error amplification unit and a voltage source and a capacitor connected between the output end of the error amplification unit and a ground.

4 Claims, 4 Drawing Sheets

LIQUID CRYSTAL DISPLAY BACKLIGHT INVERTER

CLAIM OF PRIORITY

This application claims the benefit of Korean Patent Application No. 2006-0055397 filed on Jun. 20, 2006, in the Korean Intellectual Property Office, the disclosure of which is incorporated herein by reference.

BACKGROUND OF THE INVENTION

1. Field of the Invention

The present invention relates to an inverter controlling dimming of a lamp employed in a liquid crystal display (LCD) backlight, and more particularly, to an LCD backlight inverter ultimately prolonging a life of a lamp by smoothly increasing or decreasing a current provided to the lamp in the LCD backlight when the lamp is controlled by burst dimming by using pulse width modulation (PWM).

2. Description of the Related Art

In general, an LCD is not capable of producing own light and thus employs a backlight for irradiating light from the back side to the front side thereof. To date, a cold cathode fluorescent lamp (CCFL) is mostly employed in a backlight for a large-sized LCD, together with an inverter for driving the lamp. In particular, since it is important to maintain a regulated level of brightness of the lamp employed in the backlight of the LCD, the inverter employs a constant current circuit to feed back the current of the lamp in order to maintain a regulated level of the current of the lamp. In addition, a dimming control circuit whose LCD brightness is capable of being externally adjusted according to the changes in the surrounding environment is applied. That is, an LCD backlight inverter requires a circuit for lighting the lamp at stable a brightness level set by a user.

FIG. 1 is a diagram illustrating a circuit regulating a constant current and controlling dimming in a conventional LCD backlight inverter.

As shown in FIG. 1, the conventional backlight inverter includes an error amplification unit 11 receiving a voltage corresponding to a current flowing through a lamp (the lamp current) from the lamp (not shown) as a feedback, comparing the feedback voltage with a predetermined reference voltage Vref1, and outputting a voltage corresponding to a difference; and a dimming control pulse generating unit 12 comparing an externally inputted dimming control signal with a predetermined period of triangle wave and generating a dimming control pulse with a duty controlled according to a comparison result.

The error amplification unit 11 includes an error amplifier 111 having an inversion input end to which the feedback voltage corresponding to the lamp current is inputted and a noninversion input end to which the reference voltage Vref is inputted; and a capacitor 112 connected between the inversion input end and an output end of the error amplifier 111. In addition, the dimming control pulse generating unit 12 includes a pulse width modulation (PWM) oscillator 121 generating the predetermined period of triangle wave; a first comparator 122 comparing the externally inputted dimming control signal S1 with the triangle wave S2 of the PWM oscillator 121 and generating the dimming control pulse S3 with a duty controlled according to a comparison result; and a switch 123 grounding an output end N1 of the error amplification unit 11 according to the dimming control pulse S3. In addition, the lamp control pulse generating unit 13 includes a main oscillator 131 generating a triangle wave S5; and a second comparator 132 comparing the triangle wave generated by the main oscillator 131 with an error signal S4 of the error amplification unit 11 controlled by the dimming control pulse and generating a lamp control pulse with a duty determined according to a comparison result.

FIG. 2 illustrates waveforms at a plurality of nodes in the conventional LCD backlight inverter having the above-described circuit structure. As shown in FIG. 2, the first comparator 122 of the dimming control pulse generating unit 12 compares the externally inputted dimming control signal S1 with the triangle wave S2 generated from the PWM oscillator 121 and outputs the dimming control pulse having a high state when a level of dimming control signal S1 is higher than a level of the triangle wave S2. Depending on a state of the switch 123 controlled by the dimming control pulse S3, the output part of the first error amplifier 11 is grounded. That is, the switch is turned on in a high state of the dimming control pulse S3 so that the output end N1 of the first error amplifier 11 is grounded, and the switch 123 is turned off in a low state of the dimming control pulse S3 so that the output signal of the first error amplification unit 11 is transmitted to the input end of the lamp control pulse generating unit 13. The signal transmitted to the input end of the lamp control pulse generating unit 13 is denoted by S4.

The input signal of the lamp control pulse generating unit 13 and the triangle wave S5 generated from the main oscillator 131 are compared by the second comparator 132, and the lamp control pulse S6 is outputted with a duty controlled according to a comparison result.

In such a conventional LCD backlight inverter, since dimming is controlled as the switch 123 is instantaneously turned on and off, the current transmitted to the lamp is a current with a rectangular envelope curve, having a large value and instantaneously transmitted or interrupted as shown in FIG. 2. That is, a magnitude of the lamp current is determined by duty of the lamp control pulse outputted from the second comparator 132. Since the duty of the lamp control pulse is determined according to the input signal of the second comparator 132 having high and low states by instantaneously turning on and off the switch 123, the lamp control pulse has a regulated level of duty. Therefore, the lamp current suddenly changes to a value corresponding to the duty of the lamp control pulse.

This sudden change of the lamp current, however, adversely affects the lamp, such as shortening the life of the lamp and so on. Further, the sudden change of the lamp current may cause noises in the transformer included in the LCD inverter circuit.

SUMMARY OF THE INVENTION

An aspect of the present invention provides an LCD backlight inverter preventing a sudden change of current when a lamp current is controlled to be supplied or interrupted by a switch being turned on and off, thereby enabling smooth changes of lamp current and ultimately prolonging a life of the lamp.

According to an aspect of the invention, there is provided a liquid crystal display backlight inverter including: a dimming control unit comparing a level of a triangle wave of a first frequency with a level of a dimming control signal and controlling a dimming control current to be supplied or interrupted according to a comparison result; an error amplification unit having an input end to which a detection voltage corresponding to the dimming control current and a current flowing through a lamp are inputted, comparing the detection voltage with a predetermined reference voltage, and outputting an error voltage corresponding to a difference via an output end thereof, the output end working as a ground when the dimming control current is not inputted; a time constant circuit unit comprising a resistor connected between the output end of the error amplification unit and a voltage source and a capacitor connected between the output end of the error amplification unit and a ground; and a lamp control pulse generating unit having an input end connected to the output end of the error amplification unit, comparing a level of a signal inputted via the input end with a level of a triangle wave having a second frequency, and generating a lamp control pulse with a duty controlled according to a comparison result.

The dimming control unit may include: a pulse width modulation oscillator generating the triangle wave having the first frequency; a first comparator having an inversion input end to which the triangle wave of the first frequency is inputted and a noninversion input end to which the dimming control signal is inputted, the first comparator comparing the level of the triangle wave of the first frequency with the level of the dimming control signal and outputting a dimming control pulse in a high state when the level of the dimming control signal is greater than the level of the triangle wave of the first frequency; and a current source turned on to generate the dimming control current when the dimming control pulse is in the high state and turned off when the dimming control pulse is in a low state.

The error amplification unit may include: an error amplifier having an inversion input end to which the detection voltage corresponding to the dimming control current and the current flowing through the lamp is inputted and a noninversion input end to which the reference voltage is inputted, the error amplifier receiving and comparing the detection voltage with the predetermined reference voltage and outputting the error voltage via an output end thereof; and a capacitor connected between the inversion input end and the output end of the error amplifier, wherein the output end of the error amplifier substantially becoming a ground by the capacitor being charged, when the dimming control current is inputted.

The lamp control pulse generating unit may include: a main oscillator generating the triangle wave having the second frequency greater than the first frequency; and a second comparator having an inversion input end to which the triangle wave of the second frequency is inputted and a noninversion input end to which an output signal from the error amplification unit is inputted, the second comparator comparing a level of the triangle wave of the second frequency with a level of the output signal from the error amplification unit and outputting the lamp control pulse in a high state when the level of the output signal from the error amplification unit is greater than the level of the triangle wave of the second frequency.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
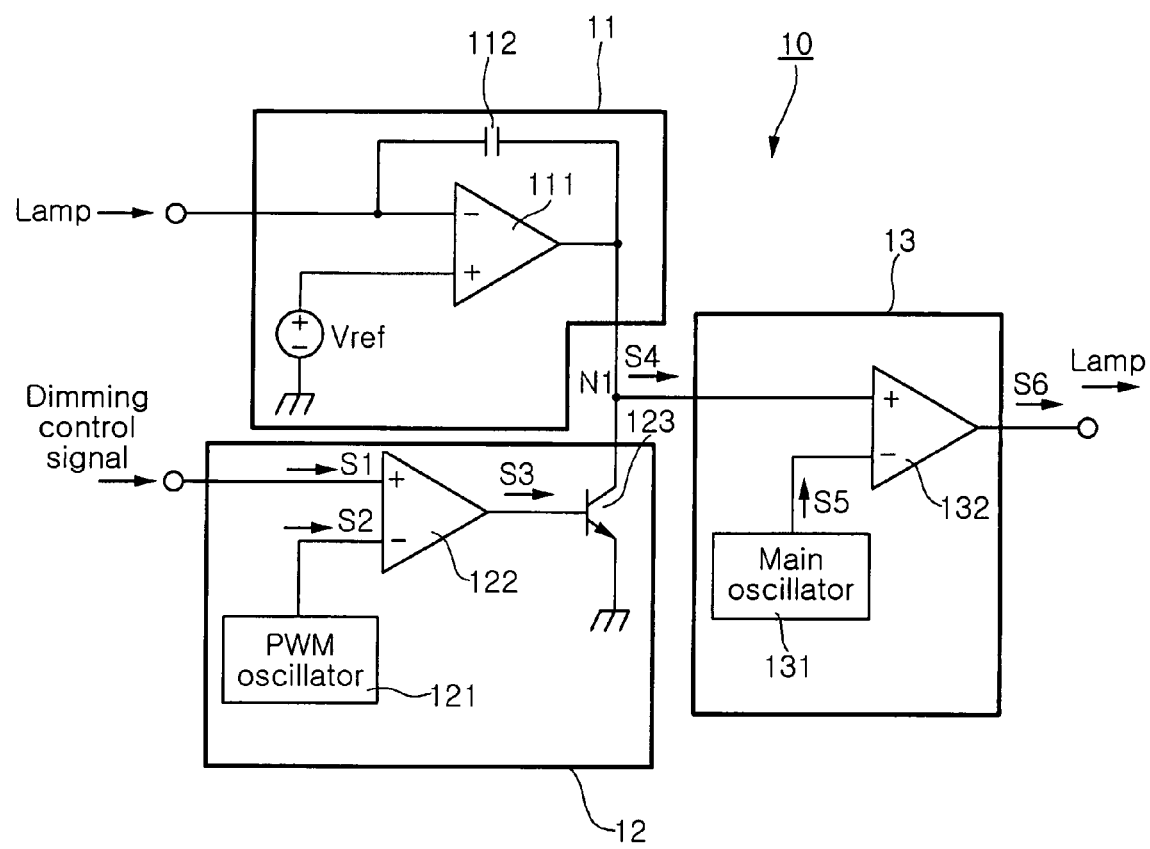
FIG. 1 is a circuit diagram illustrating a conventional LCD backlight inverter.
Figure 2:
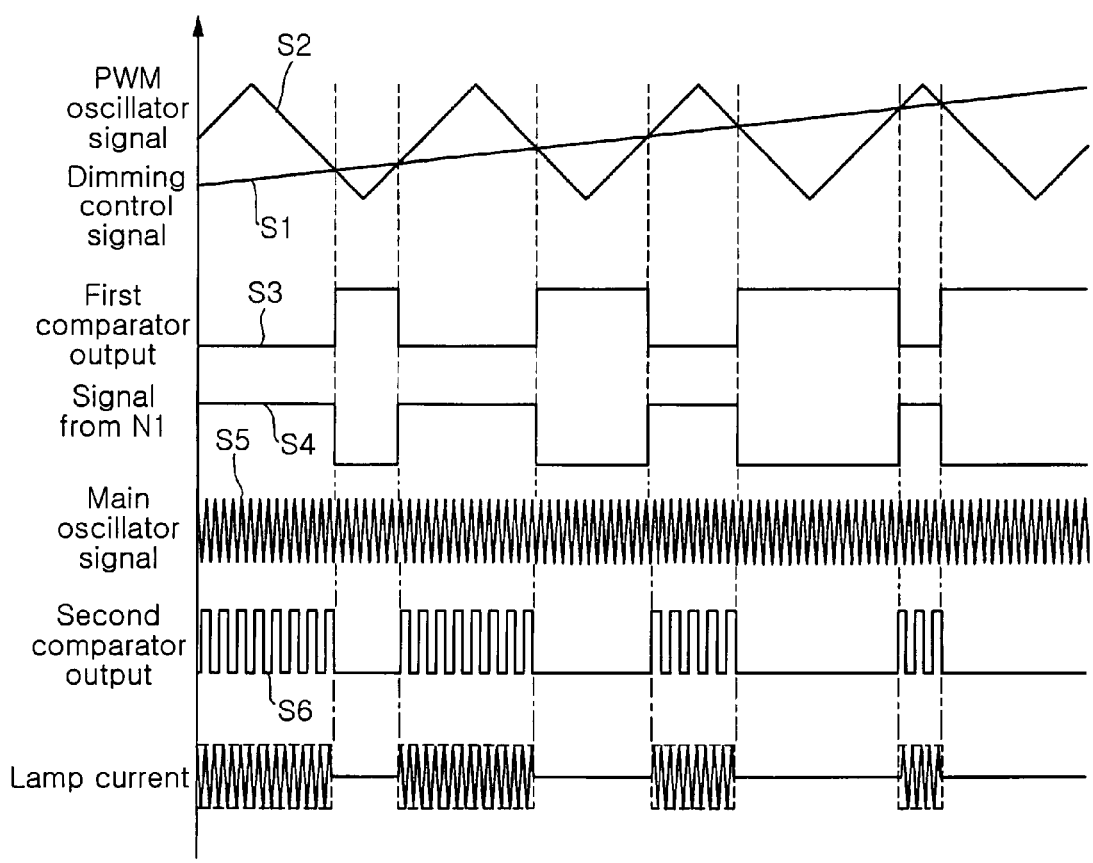
FIG. 2 is a diagram illustrating waveforms at different nodes of the conventional LCD backlight inverter.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity.

Figure 3:
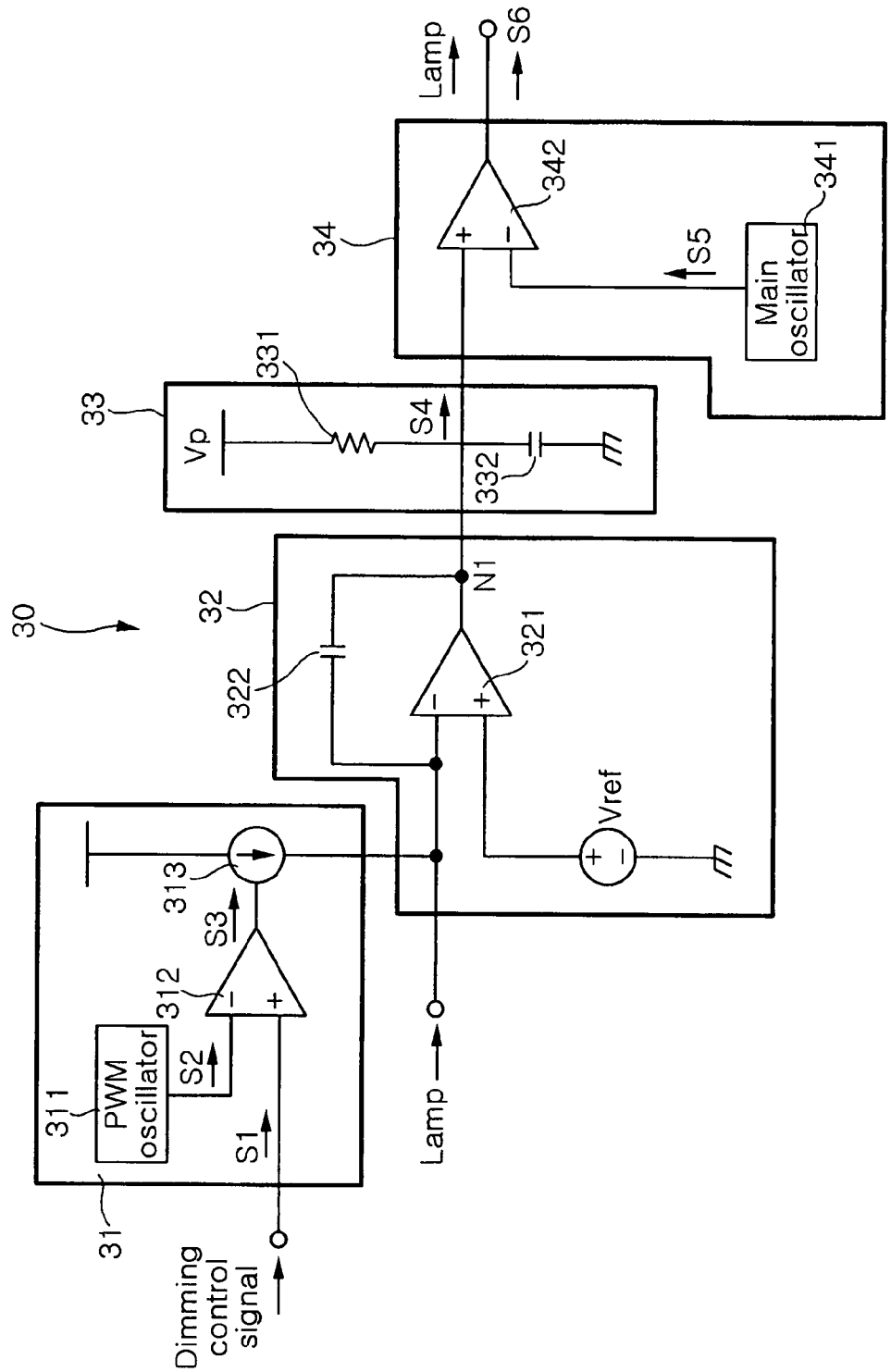
FIG. 3 is a circuit diagram illustrating an LCD backlight inverter according to an exemplary embodiment of the present invention.

FIG. 3 is a circuit diagram illustrating an LCD backlight inverter according to an exemplary embodiment of the present invention.

Referring to FIG. 3, the LCD backlight inverter 30 includes a dimming control unit 31, an error amplification unit 32, a time constant circuit unit 33, and a lamp control pulse generating unit 34.

The dimming control unit 31 compares a triangle wave S2 having a first frequency with a dimming control signal S1 externally inputted by a user and controls a dimming control current to be supplied or interrupted according to a comparison result.

In detail, the dimming control unit 31 may include a pulse width modulation (PWM) oscillator generating the triangle wave S2 having the first frequency; the first comparator 312 having an inversion input end to which the triangle wave S1 of the first frequency is inputted and a noninversion input end to which the dimming control signal S1 is inputted, comparing the triangle wave of the first frequency with the dimming control signal, and outputting a dimming control pulse having a high state when the level of the dimming control signal is higher than the level of the triangle wave of the first frequency; a current source 313 turned on to generate the dimming control current when the dimming control pulse S3 is in a high state and turned off when the dimming control pulse S3 is in a low state.

The error amplification unit 32 has an input end to which a detected voltage corresponding to a current (lamp current) flowing through the lamp from the lamp is inputted and an output end N1 from which an error voltage corresponding to a difference between the detected voltage and a predetermined reference voltage is outputted. In particular, the dimming control current provided from the current source 313 of the dimming control unit 31 is inputted via the input end of the error amplification unit, and the output end N1 of the error amplification unit 32 substantially becomes a ground when the dimming control current is inputted.

In detail, the error amplification unit 32 may include an error amplifier 321 and a capacitor 322. The error amplifier 321 has an inversion input end to which the detected voltage corresponding to the dimming control current and the current flowing through the lamp are inputted and a noninversion input end to which the reference voltage is inputted. When the dimming control current is not inputted, the error amplifier receives and compares the detected voltage and the predetermined reference voltage and outputs an error voltage corresponding to a difference. The capacitor 322 is connected between the inversion input end and the output end of the error amplifier 321.

The time constant circuit unit 33 includes a resistor 331 connected between the output end of the error amplification unit 32 and a voltage source Vp; and a capacitor 332 connected between the output end of the error amplification unit 32 and a ground.

The lamp control pulse generating unit 34 has an input end connected to the output end N1 of the error amplification unit 32, compares a level of a signal S4 inputted through the input end thereof with a level of a triangle wave S5 having a second frequency, and generates a lamp control pulse S6 with a duty controlled according to a comparison result.

In detail, the lamp control pulse generating unit 34 may include a main oscillator 341 generating the triangle wave S5 of the second frequency greater than the first frequency; and a second comparator 342 having an inversion input end to which the triangle wave S5 of the second frequency is inputted and a noninversion input end to which the output signal S4 from the error amplification unit 32 is inputted and comparing a level of the triangle wave S6 of the second frequency with a level of the output signal from the error amplification unit 32 and outputting the lamp control pulse S6 having a high state when the level of the output signal S4 from the error amplification unit 32 is greater than a level of the triangle wave S5.

Hereinafter, the operations of the LCD backlight inverter according to an exemplary embodiment of the present invention will be described in detail.

Figure 4:
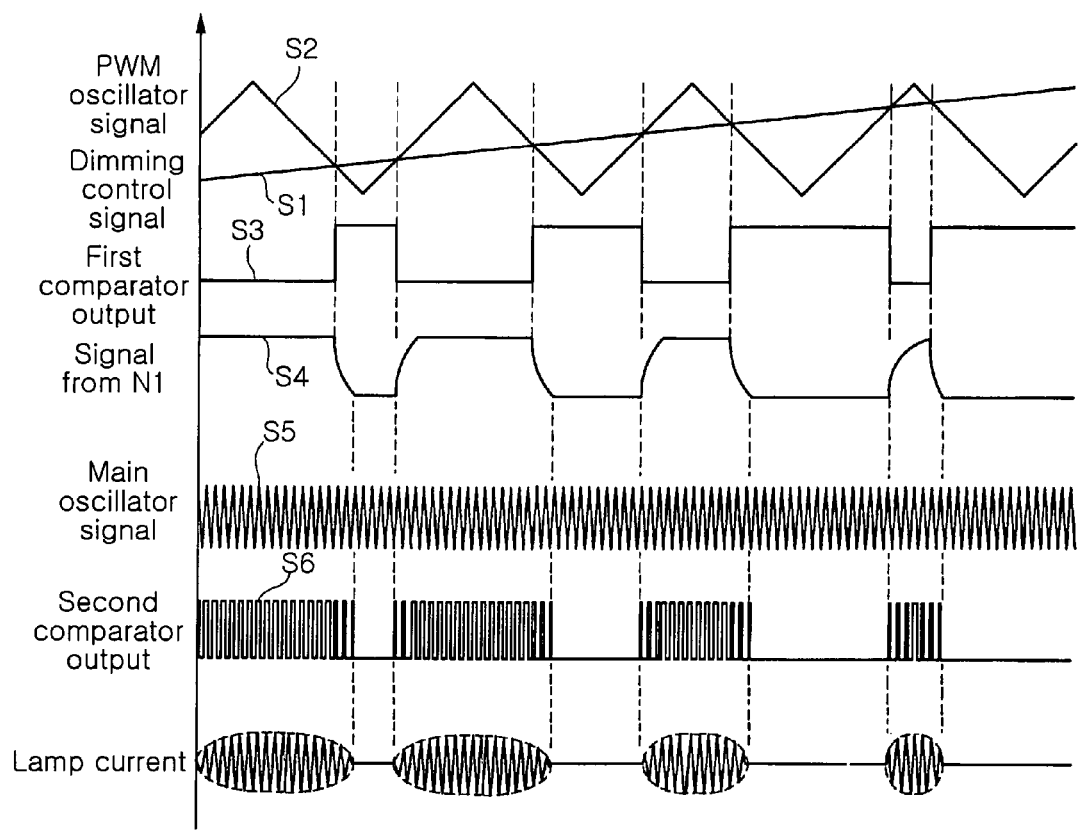
FIG. 4 is a diagram illustrating waveforms at different nodes of the LCD backlight inverter according to an exemplary embodiment of the present invention.

FIG. 4 is a diagram illustrating waveforms at a plurality of nodes in the LCD backlight inverter.

Referring to FIGS. 3 and 4, a dimming control signal S1 determined by the user is externally inputted to the dimming control unit 31, and the dimming control signal S1 is compared with a triangle wave S2 having a first frequency by the first comparator 312. The triangle wave S2 of the first frequency is inputted to the inversion input end of the first comparator 312, and the dimming control signal S1 is inputted to the noninversion input end of the first comparator 312. Therefore, the first comparator 312 outputs a dimming control pulse S3 having a high state when the level of the dimming control signal S1 is higher than the level of the triangle wave S2. Though the dimming control signal S2 is gradually increasing in FIG. 4, this is only to illustrate a method of determining the duty of the dimming control signal outputted from the first comparator 312.

In addition, the detected voltage corresponding to the lamp current running through the lamp is inputted from the lamp to the input end of the error amplification unit 32. The input end of the error amplification unit 32 is connected to the inversion input end of the error amplifier 321 of the error amplification unit 32, and a predetermined reference voltage is inputted to the noninversion end of the error amplification unit 321. The error amplification unit 321 compares the detected voltage with the reference voltage and outputs an error voltage corresponding to a difference.

In the meantime, the dimming control pulse S3 outputted from the first comparator 312 of the dimming control unit 31 is used as a signal controlling the current source 313 to be turned on and off. When the dimming control pulse S3 is in a high state, the current source 313 is turned on to provide a predetermined current to the inversion input end of the error amplifier 321. In this case, the capacitor 322 connected between the inversion input end and the output end of the error amplifier 321 is charged by the current provided from the current source 313, and thereby the output end (the output end N1 of the error amplification unit 32) of the error amplifier 321 substantially becomes a ground. In addition, when the dimming control pulse S3 is in a low state, the current source 313 is turned off, and the error voltage corresponding to the difference between the detected voltage and the reference voltage is outputted from the output end of the error amplifier 321. That is, the signal from the output end of the error amplification unit 32 is in a low state when the dimming control pulse S3 is in a high state, and is in a high state when the dimming control pulse S3 is in a low state.

In addition, the time constant circuit unit 33 is connected to the output end of the error amplification unit 32. The time constant circuit unit 33 includes a resistor 331 connected between the output end of the error amplification unit 32 and a voltage source Vp; and a capacitor 332 connected between the output end of the error amplification unit 32 and a ground. By the time constant determined by the resistance value of the resistor 331 and the capacitance value of the capacitor 332 included in the time constant circuit unit 33, the signal S4 outputted from the error amplifier 321 is changed smoothly, not suddenly, between high and low states. In the same fashion, when the signal S4 outputted from the error amplifier 321 changes smoothly, not suddenly, between high and low states by the time constant determined by the resistance value of the resistor 331 and the capacitance value of the capacitor 332 included in the time constant circuit unit 33. That is, the signal inputted to the lamp control pulse generating unit 34 may change smoothly between high and low states by the time constant determined by the resistance value of the resistor 331 and the capacitance value of the capacitor 332 included in the time constant circuit unit 33 as denoted by S4 in FIG. 4.

The signal S4, whose state is smoothly changed, is outputted from the output end of the error amplification unit 32 and inputted to the noninversion input end of the second comparator 342 in the lamp control pulse generating unit 34. The second comparator 342 receives the triangle wave S5 of the second frequency, outputted from the main oscillator 341, via an inversion input end thereof, compares the triangle wave S5 with the signal S4 from the output end of the error amplification unit 32, and outputs the lamp control pulse S6, with a duty determined from the comparison, through an output end thereof. Similar to the method of generating the dimming control pulse in the first comparator 312 of the dimming control unit 31 as described above, the second comparator 342 generates the lamp control pulse S6 having a high state when the level of the output signal S4 of the error amplification unit 31 is greater than the level of the triangle wave S5 of the second frequency and having a low state when the triangle wave S5 of the second frequency is greater than the level of the output signal S4. As the sifts between high and low states of the output signal S4 of the error amplification unit 31 is made smoothly, the duty of the lamp control pulse S6 does not change suddenly but gradually decreases or increases. Therefore, as shown in FIG. 4, the lamp current controlled by the lamp control pulse S6 may also increase or decrease gradually.

Therefore, the present invention prevents shortening of the life of the lamp and the noises generated in the transformer of the inverter due to the sudden changes of the lamp current.

As described above, the present invention prevents the sudden changes of the lamp current and allows smooth changes of the lamp current, ultimately prolonging the life of the lamp. Furthermore, the present invention may decrease the noises in the transformer due to the sudden changes of the signal provided to the transformer in the inverter.

While the present invention has been shown and described in connection with the exemplary embodiments, it will be apparent to those skilled in the art that modifications and variations may be made without departing from the spirit and scope of the invention as defined by the appended claims.

What is claimed is:

1. A liquid crystal display backlight inverter comprising:
   a dimming control unit comparing a level of a triangle wave of a first frequency with a level of a dimming control signal and controlling a dimming control current to be supplied or interrupted according to a comparison result;

an error amplification unit having an input end to which a detection voltage corresponding to the dimming control current and a current flowing through a lamp are inputted, comparing the detection voltage with a predetermined reference voltage, and outputting an error voltage corresponding to a difference via an output end thereof, the output end configured to ground when the dimming control current is not inputted;

a time constant circuit unit comprising a resistor connected between the output end of the error amplification unit and a voltage source and a capacitor connected between the output end of the error amplification unit and a ground; and a lamp control pulse generating unit having an input end connected to the output end of the error amplification unit, comparing a level of a signal inputted via the input end with a level of a triangle wave having a second frequency, and generating a lamp control pulse with a duty controlled according to a comparison result.

2. The inverter according to claim 1, wherein the dimming control unit comprises:

a pulse width modulation oscillator generating the triangle wave having the first frequency;

a first comparator having an inversion input end to which the triangle wave of the first frequency is inputted and a noninversion input end to which the dimming control signal is inputted, the first comparator comparing the level of the triangle wave of the first frequency with the level of the dimming control signal and outputting a dimming control pulse in a high state when the level of the dimming control signal is greater than the level of the triangle wave of the first frequency; and a current source turned on to generate the dimming control current when the dimming control pulse is in the high state and turned off when the dimming control pulse is in a low state.

3. The inverter according to claim 1, wherein the error amplification unit comprises:

an error amplifier having an inversion input end to which the detection voltage corresponding to the dimming control current and the current flowing through the lamp is inputted and a noninversion input end to which the reference voltage is inputted, the error amplifier receiving and comparing the detection voltage with the predetermined reference voltage and outputting the error voltage via an output end thereof; and a capacitor connected between the inversion input end and the output end of the error amplifier, wherein the output end of the error amplifier substantially becomes a ground with the capacitor charged, when the dimming control current is inputted.

4. The inverter according to claim 1, wherein the lamp control pulse generating unit comprises:

a main oscillator generating the triangle wave having the second frequency greater than the first frequency; and a second comparator having an inversion input end to which the triangle wave of the second frequency is inputted and a noninversion input end to which an output signal from the error amplification unit is inputted, the second comparator comparing a level of the triangle wave of the second frequency with a level of the output signal from the error amplification unit and outputting the lamp control pulse in a high state when the level of the output signal from the error amplification unit is greater than the level of the triangle wave of the second frequency.

* * * * *